United States Patent
Ibata et al.

(10) Patent No.: US 8,254,087 B2
(45) Date of Patent: Aug. 28, 2012

(54) SOLID ELECTROLYTIC CAPACITOR

(75) Inventors: Yasuko Ibata, Osaka (JP); Hiroya Nishimoto, Higashiosaka (JP); Takeshi Takamatsu, Daito (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 182 days.

(21) Appl. No.: 12/713,671

(22) Filed: Feb. 26, 2010

(65) Prior Publication Data

US 2010/0226071 A1    Sep. 9, 2010

(30) Foreign Application Priority Data

Mar. 3, 2009 (JP) ................. 2009-049470

(51) Int. Cl.
*H01G 4/228* (2006.01)
*H01G 9/00* (2006.01)
*H01G 9/145* (2006.01)

(52) U.S. Cl. ....................... 361/540; 361/528

(58) Field of Classification Search .......... 361/540, 361/528, 529, 539

See application file for complete search history.

(56) References Cited

U.S. PATENT DOCUMENTS

| | | | | |
|---|---|---|---|---|
| 6,294,826 B1* | 9/2001 | Ida et al. | ........ | 257/677 |
| 6,819,546 B2* | 11/2004 | Kuriyama | ........ | 361/535 |
| 7,271,995 B2* | 9/2007 | Edson et al. | ........ | 361/540 |
| 2008/0232039 A1* | 9/2008 | Saito et al. | ........ | 361/534 |

FOREIGN PATENT DOCUMENTS

| | | |
|---|---|---|
| JP | 2002-134359 A | 5/2002 |
| JP | 2007-258496 A | 10/2007 |

* cited by examiner

*Primary Examiner* — Eric Thomas
(74) *Attorney, Agent, or Firm* — Westerman, Hattori, Daniels & Adrian, LLP (57) ABSTRACT

The solid electrolytic capacitor includes a capacitor element including an anode section, a dielectric film, and a cathode section, a wiring member on which the capacitor element is mounted, and an enclosure resin coating the capacitor element. The wiring member includes an insulating base, a first anode terminal portion connected to the anode section is provided on a first surface of the insulating base on which the capacitor element is mounted, the first anode terminal portion includes a connection part integrally formed therewith for electrically connecting the first anode terminal portion and the anode section to each other, a second anode terminal portion connected to the first anode terminal portion is provided on a second surface of the insulating base opposed to the first surface, and the first and second anode terminal portions are connected by an anode conduction part provided on a side surface of the insulating base.

4 Claims, 10 Drawing Sheets

SOLID ELECTROLYTIC CAPACITOR

The application No. 2009-049470, upon which this patent application is based, is hereby incorporated by reference.

BACKGROUND OF THE INVENTION

1. Field of the Invention

The present invention relates to a solid electrolytic capacitor formed by mounting a capacitor element on an insulating substrate.

2. Description of Related Art

Figure 12:
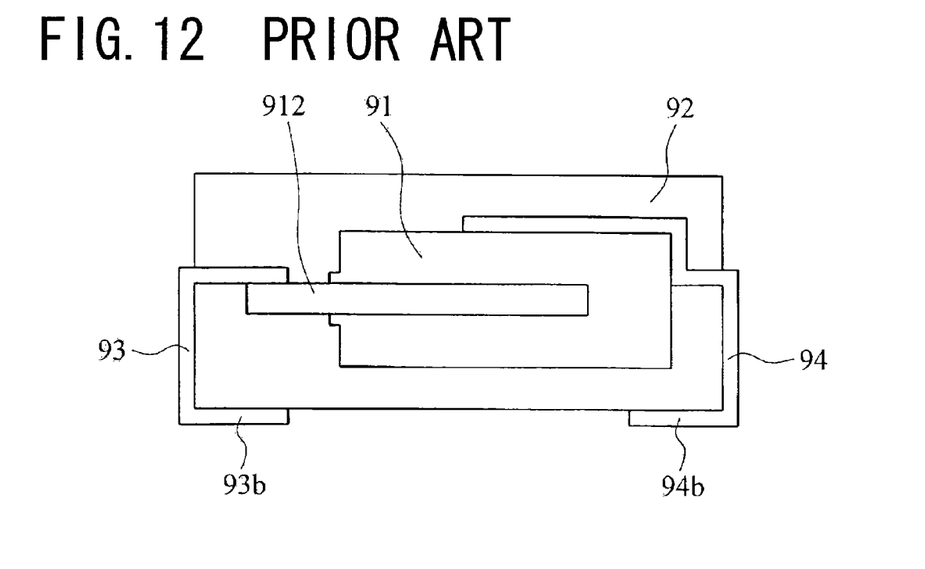
FIG. 12 is a cross-sectional view of a conventional solid electrolytic capacitor.

As a conventional solid electrolytic capacitor, known is a capacitor having a structure shown in FIG. 12. This solid electrolytic capacitor includes a capacitor element 91, an anode terminal 93, a cathode terminal 94, and an enclosure resin 92. An anode lead member 912 which is a part of the capacitor element 91 is electrically connected to the anode terminal 93 by resistance welding. A cathode section (not shown) of the capacitor element 91 is electrically connected to the cathode terminal 94 by an electrically-conductive adhesive (not shown). The anode terminal 93 and the cathode terminal 94 are drawn out from the enclosure resin 92, and are bent along a side surface and a lower surface of the solid electrolytic capacitor. Thus, an anode terminal lower surface part 93b and a cathode terminal lower surface part 94b form lower surface electrodes of the solid electrolytic capacitor.

Figure 13:
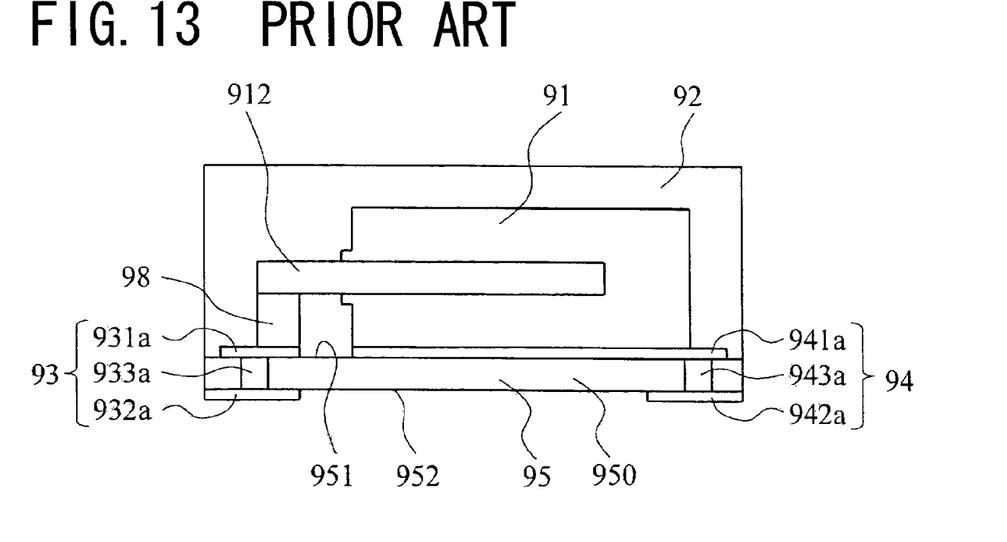
FIG. 13 is a cross-sectional view of a conventional solid electrolytic capacitor.

As another conventional solid electrolytic capacitor, known is a capacitor having a structure shown in FIG. 13. This solid electrolytic capacitor includes the capacitor element 91, a wiring member 95 (e.g., a printed board) and the enclosure resin 92. The wiring member 95 includes an insulating base 950. The anode terminal 93 comprises a first anode terminal portion 931a formed on an upper surface 951 of the insulating base 950, a second anode terminal portion 932a formed on a lower surface 952 of the insulating base 950, and an anode via 933a opening in the insulating base 950 to electrically connect the first anode terminal portion 931a and the second anode terminal portion 932a to each other. The cathode terminal 94 comprises a first cathode terminal portion 941a formed on the upper surface 951 of the insulating base 950, a second cathode terminal portion 942a formed on the lower surface 952 of the insulating base 950, and a cathode via 943a opening in the insulating base 950 to electrically connect the first cathode terminal portion 941a and the second cathode terminal portion 942a to each other.

In the solid electrolytic capacitor described above, to the first anode terminal portion 931a, electrically connected is the anode lead member 912 of the capacitor element 91 through a pad member 98, while, to the first cathode terminal portion 941a, electrically connected is the cathode section (not shown) of the capacitor element 91 by the electrically-conductive adhesive (not shown). The second anode terminal portion 932a and the second cathode terminal portion 942a form the lower surface electrodes of the solid electrolytic capacitor.

Figure 14:
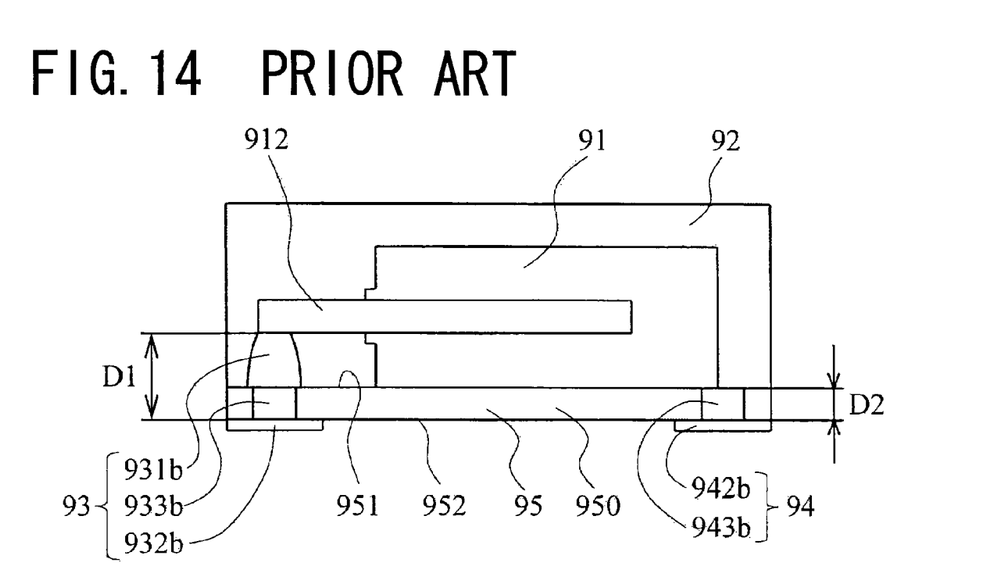
FIG. 14 is a cross-sectional view of a conventional solid electrolytic capacitor.

As a further conventional solid electrolytic capacitor, known is a capacitor having a structure shown in FIG. 14. This solid electrolytic capacitor includes the capacitor element 91, the wiring member 95 (e.g., a printed board) and the enclosure resin 92. The wiring member 95 includes the insulating base 950. The anode terminal 93 comprises a first anode terminal portion 931b formed on the upper surface 951 of the insulating base 950, a second anode terminal portion 932b formed on the lower surface 952 of the insulating base 950, and an anode via 933b opening in the insulating base 950 to electrically connect the first anode terminal portion 931b and the second anode terminal portion 932b to each other. The cathode terminal 94 comprises a second cathode terminal portion 942b formed on the lower surface 952 of the insulating base 950, and a cathode via 943b opening in the insulating base 950 to be electrically connected to the second cathode terminal portion 942b.

In the solid electrolytic capacitor described above, the first anode terminal portion 931b is electrically connected to the anode lead member 912 of the capacitor element 91, while the cathode via 943b is electrically connected to the cathode section (not shown) of the capacitor element 91 by the electrically-conductive adhesive (not shown). The second anode terminal portion 932b and the second cathode terminal portion 942b form the lower surface electrodes of the solid electrolytic capacitor.

However, in the manufacturing process of the conventional solid electrolytic capacitor shown in FIG. 12, required is a complicated work to bend the anode terminal 93 and the cathode terminal 94. Also, since the enclosure resin 92 of appropriate thickness needs to be intervened between the lower surface of the capacitor element 91 and the anode terminal lower surface part 93b, and between the lower surface of the capacitor element 91 and the cathode terminal lower surface part 94b, there has been a problem of lower occupancy of the capacitor element 91 in the solid electrolytic capacitor, or, a problem of greater equivalent series resistance (ESR) and equivalent series inductance (ESL) due to an increase in length of the anode terminal 93 and the cathode terminal 94.

In the conventional solid electrolytic capacitor shown in FIG. 13, the anode lead member 912 of the capacitor element 91 and the anode terminal 93 are connected to each other by the pad member 98 which is a different member from the wiring member 95. Therefore, in a manufacturing process of the capacitor, required is a process to fix the pad member 98 to the anode terminal 93. Also, the ESR or ESL might increase significantly due to poor connection or the like generated between the pad member 98 and the anode terminal 93.

In the conventional solid electrolytic capacitor shown in FIG. 14, the first anode terminal portion 931b and the anode via 933b are produced by electrolytic plating. A thickness D1 of a plating layer forming the anode terminal 93 (a distance between the anode lead member 912 and the second anode terminal portion 932b) is substantially different from a thickness D2 of a plating layer forming the cathode terminal (a thickness of the wiring member 95). Therefore, in the case where the plating formations of the anode terminal portion and the cathode terminal portion are performed simultaneously, it is considerably difficult to control the plating layer thickness D1 and the plating layer thickness D2 to be desired thicknesses, and therefore, there has been a problem of significantly poor yield ratio. Moreover, in the case where the formation of the plating layer having the thickness D1 to form the anode terminal portion and the formation of the plating layer having the thickness D2 to form the cathode terminal portion are performed in separate processes, the number of the plating processes is doubled. Therefore, there has been a problem of cost increase such as working hour, plating liquid replacement or the like.

In addition, since the thickness D1 of the plating layer is several hundred μm, there has also been a problem of longer time for electrolytic plating and greater man-hour which could lead to cost increase.

SUMMARY OF THE INVENTION

In view of above described problems, an object of the present invention is to provide a solid electrolytic capacitor which is easily-manufactured with low cost, and in which the ESR or ESL is reduced.

A first solid electrolytic capacitor according to the present invention comprises: a capacitor element including an anode section, a dielectric film, and a cathode section; a wiring member on which the capacitor element is mounted; and an enclosure resin coating the capacitor element. The wiring member includes an insulating base, a first anode terminal portion connected to the anode section is provided on a first surface of the insulating base on which the capacitor element is mounted, the first anode terminal portion includes a connection part integrally formed therewith for electrically connecting the first anode terminal portion and the anode section to each other, a second anode terminal portion connected to the first anode terminal portion is provided on a second surface of the insulating base opposed to the first surface, and the first anode terminal portion and the second anode terminal portion are connected to each other by an anode conduction part provided on a side surface of the insulating base.

A second solid electrolytic capacitor according to the present invention is the first solid electrolytic capacitor described above, wherein the anode section comprises an anode body formed of a sintered body of a valve metal, and an anode lead member planted in the anode body, the connection part projects from a basal part of the first anode terminal portion, and the anode lead member is connected to the connection part.

A third solid electrolytic capacitor according to the present invention is the first solid electrolytic capacitor described above, wherein the anode section includes the anode body which is a foil-like body of a valve metal, the dielectric film is formed on a part of an outer peripheral surface of the anode body, the cathode section is formed on the dielectric film, and an exposed part which is a part of the outer peripheral surface of the anode body where the dielectric film is not formed is connected to the connection part.

DETAILED DESCRIPTION OF THE PREFERRED EMBODIMENT

Preferred embodiments of the present invention are described in detail below with reference to the drawings.

[First Embodiment]

Figure 1:
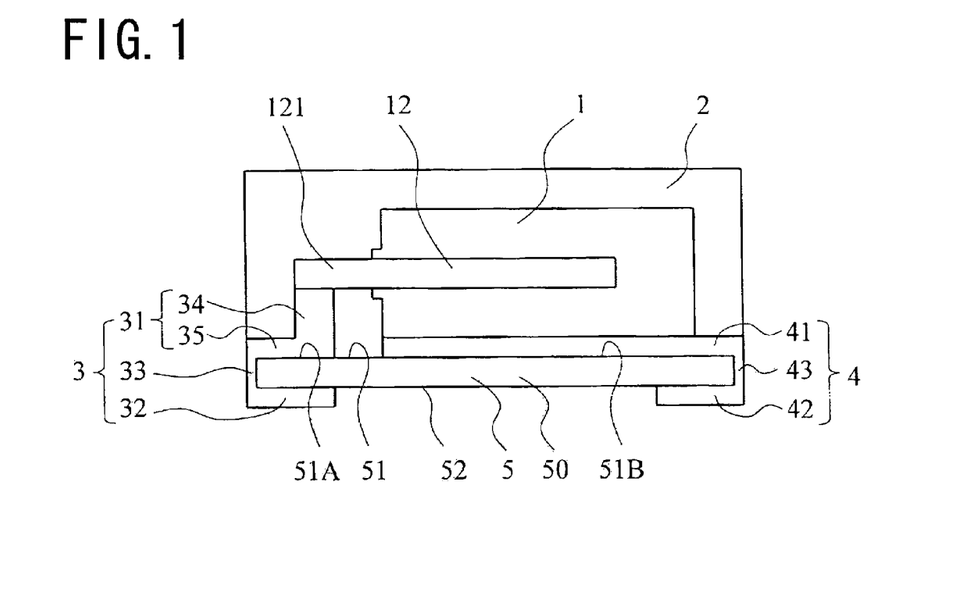
FIG. 1 is a cross-sectional view of a solid electrolytic capacitor according to a first embodiment of the present invention.

As shown in FIG. 1, a solid electrolytic capacitor according to a first embodiment of the present invention is formed by mounting a capacitor element 1 on a wiring member 5.

Figure 2:
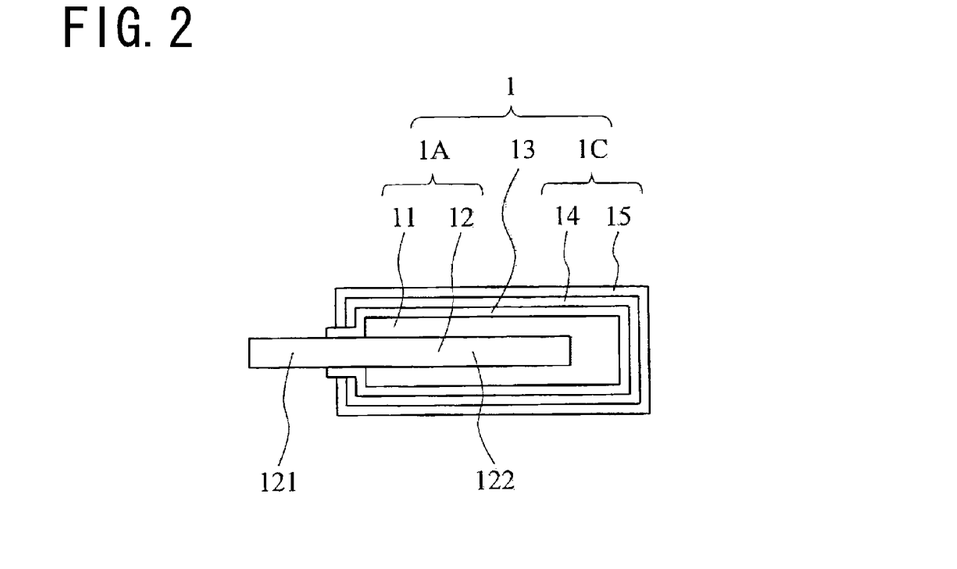
FIG. 2 is a cross-sectional view of a capacitor element according to the first embodiment of the present invention.

As shown in FIG. 2, the capacitor element 1 comprises an anode body 11 in which an anode lead member 12 is planted, a dielectric film 13 formed on an outer peripheral surface of the anode body 11, a solid electrolyte layer 14 formed on the dielectric film 13, and a cathode layer 15 formed on the solid electrolyte layer 14.

The anode body 11 is formed of a sintered body of a valve metal (tantalum, niobium, titanium, aluminum, or the like).

The anode lead member 12 includes an anode lead-out part 121 projecting from the outer peripheral surface of the anode body 11 and an anode lead buried part 122 buried in the anode body 11. The anode lead member 12 is formed of a valve metal of the same kind as or different kind from the valve metal forming the anode body 11, and the anode body 11 and the anode lead member 12 are electrically connected to each other. The anode body 11 and anode lead member 12 form an anode section 1A.

The dielectric film 13 is formed by an oxide film formed on the outer peripheral surface of the anode body 11, and the oxide film is formed by immersing the anode body 11 in an electrolytic solution such as phosphate aqueous solution, adipic acid aqueous solution, or the like to oxidize the outer peripheral surface of the anode body 11 electrochemically (anodic oxidation).

The solid electrolyte layer 14 is formed of an electrically-conductive inorganic material such as manganese dioxide or the like, or an electrically-conductive organic material such as TCNQ (Tetracyano-quinodimethane) complex salt, electrically-conductive polymer or the like, and formed on the dielectric layer 13.

The cathode layer 15 is formed by a carbon layer formed on the solid electrolyte layer 14 and a silver paste layer formed on the carbon layer, and the solid electrolyte layer 14 and the cathode layer 15 are electrically connected to each other. The solid electrolyte layer 14 and the cathode layer 15 form a cathode section 10.

As shown in FIG. 1, the wiring member 5 comprises an insulating base 50 which is formed of an insulating material, and an anode terminal 3 and a cathode terminal 4 are formed on the insulating base 50. The anode terminal 3 is formed by a first anode terminal portion 31 formed on an upper surface (a first surface) 51 of the insulating base 50 on which the capacitor element 1 is mounted and a second anode terminal portion 32 formed on a lower surface (a second surface) 52 located on the opposite side to the upper surface 51 which are electrically connected to each other by an anode conduction part 33. The anode conduction part 33 is arranged along a side surface of the solid electrolytic capacitor.

The first anode terminal portion 31 includes a connection part 34 and a basal part 35, and the anode lead-out part 121 is electrically connected to an end part of the connection part 34 by, for example, resistance welding or laser welding. The connection part 34 projects from the basal part 35 extending along the insulating base 50, and the connection part 34 is formed integrally with the basal part 35.

The cathode terminal 4 is formed by a first cathode terminal portion 41 formed on the upper surface 51 of the insulating base 50 and a second cathode terminal portion 42 formed on the lower surface 52 of the insulating base 50 which are electrically connected to each other by a cathode conduction part 43. To the first cathode terminal portion 41, electrically connected is the cathode layer 15 of the capacitor element 1, namely the cathode section 1C, by the electrically-conductive adhesive. The first cathode terminal portion 41 extends along the insulating base 50. The cathode conduction part 43 is arranged along the side surface of the solid electrolytic capacitor.

In the first embodiment, the upper surface 51 of the insulating base 50 is flat and does not have a step. On the upper surface 51, an anode terminal portion forming area 51A where the first anode terminal portion 31 is formed and a cathode terminal portion forming area 51B where the first cathode terminal portion 41 is formed are included in the same plane.

A manufacturing method of the above described solid electrolytic capacitor is explained below. The manufacturing method includes an electrode forming step of forming the anode terminal 3 and the cathode terminal 4 on the insulating base 50, an element mounting step of mounting the capacitor element 1 on the wiring member 5, a resin coating step of coating the capacitor element 1 with the enclosure resin, and a cutting step of cutting the wiring member 5 to complete the solid electrolytic capacitor.

The electrode forming step includes first to fourth steps. In the electrode forming step, the first to fourth steps are executed in this order.

Figure 3A:
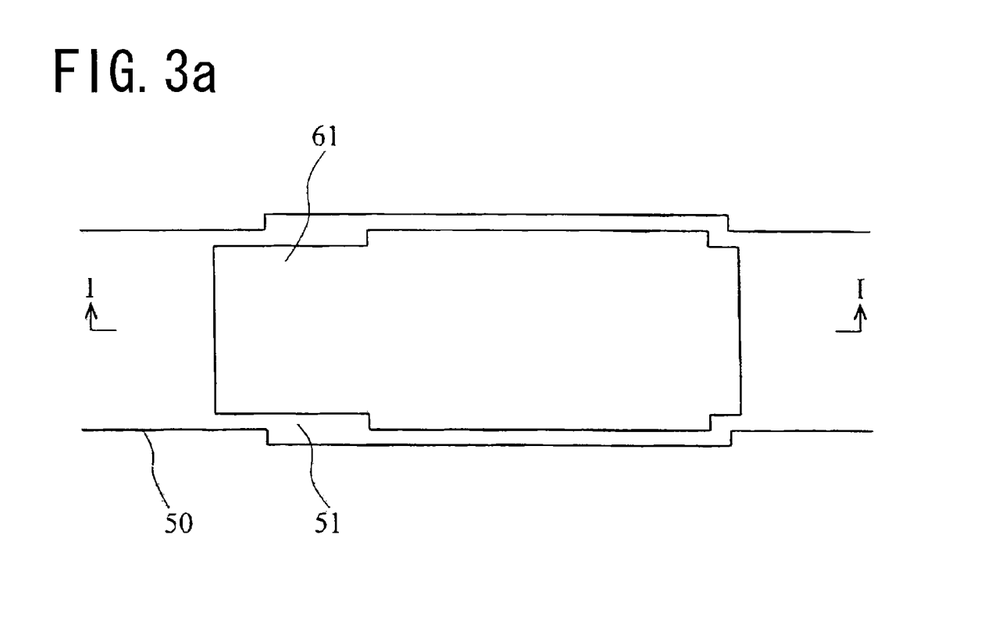
FIGS. 3a and 3b are views for explaining one step of an electrode forming step of the first embodiment.
Figure 3B:
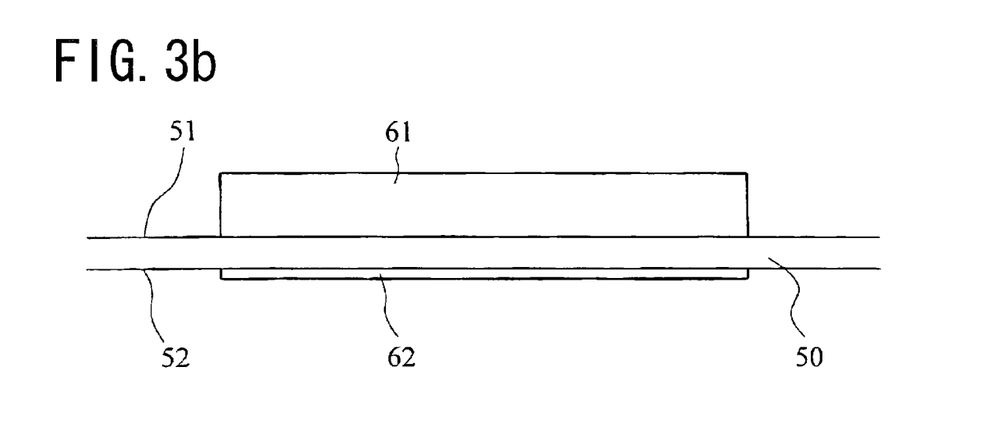

The first step is described with reference to FIGS. 3a and 3b. FIG. 3a is a top view, and FIG. 3b is a cross-sectional view cut along a line I-I shown in FIG. 3a. One piece of copper sheet (a parent material) 61 is bonded to the upper surface 51 of the insulating base 50, and one piece of copper sheet (a parent material) 62 is bonded to the lower surface 52 of the insulating base 50. As the copper sheet 61, employed is a sheet having a greater thickness than the copper sheet 62.

Figure 4A:
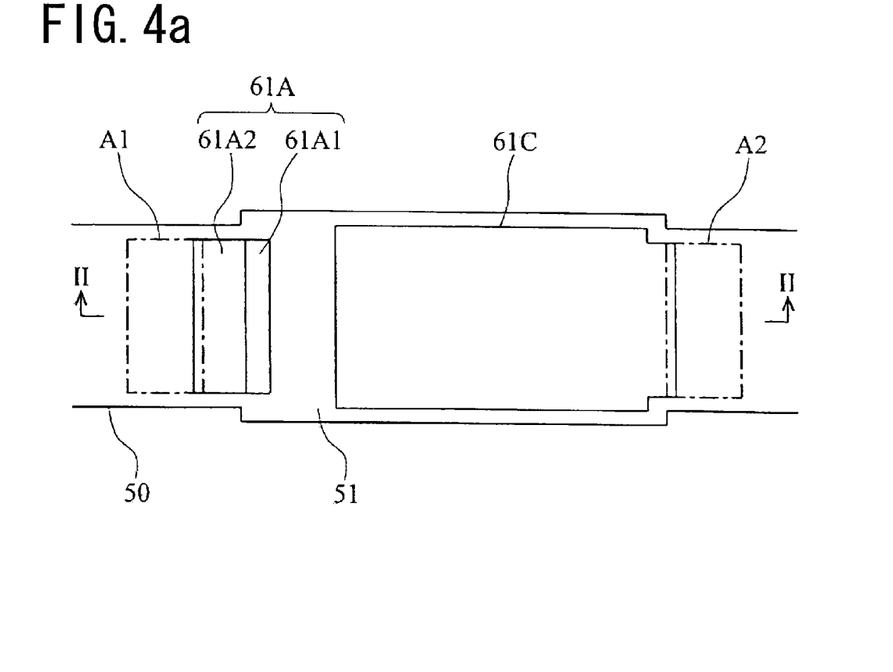
FIGS. 4a and 4b are views for explaining one step of the electrode forming step of the first embodiment.
Figure 4B:
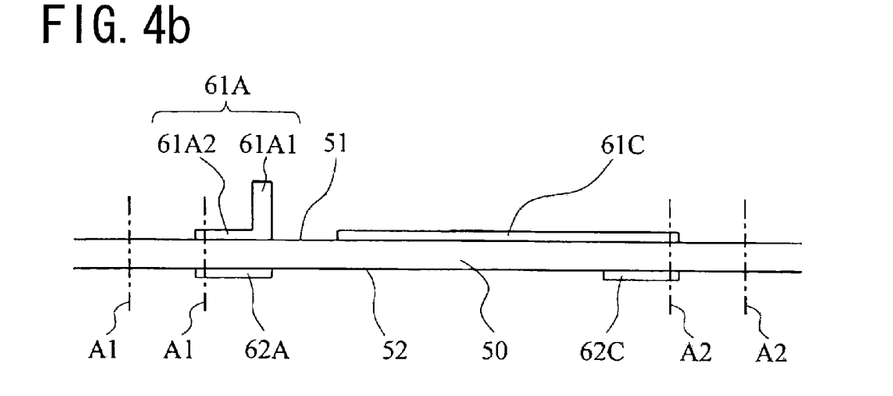

The second step is described with reference to FIGS. 4a and 4b. FIG. 4a is a top view, and FIG. 4b is a cross-sectional view cut along a line II-II shown in FIG. 4a. The copper sheet 62 bonded to lower surface 52 of the insulating base 50 is etched to form a second anode parent material part 62A and a second cathode parent material part 62C having nearly equal thicknesses as shown in FIG. 4b.

Also, the copper sheet 61 bonded to the upper surface 51 of the insulating base 50 is etched to form a first anode parent material part 61A and a first cathode parent material part 61C as shown in FIGS. 4a and 4b. The first anode parent material part 61A includes a parent material connection part 61A1 and a parent material basal part 61A2, and the parent material connection part 61A1 projects from the parent material basal part 61A2. The parent material basal part 61A2 of the first anode parent material part 61A and the first cathode parent material part 61C have nearly equal thicknesses. Thus, by forming the parent material connection part 61A1 and the parent material basal part 61A2 from the one piece of copper sheet 61 by etching, the first anode parent material part 61A is formed by the parent material connection part 61A1 and the parent material basal part 61A2 integrated together.

Figure 5A:
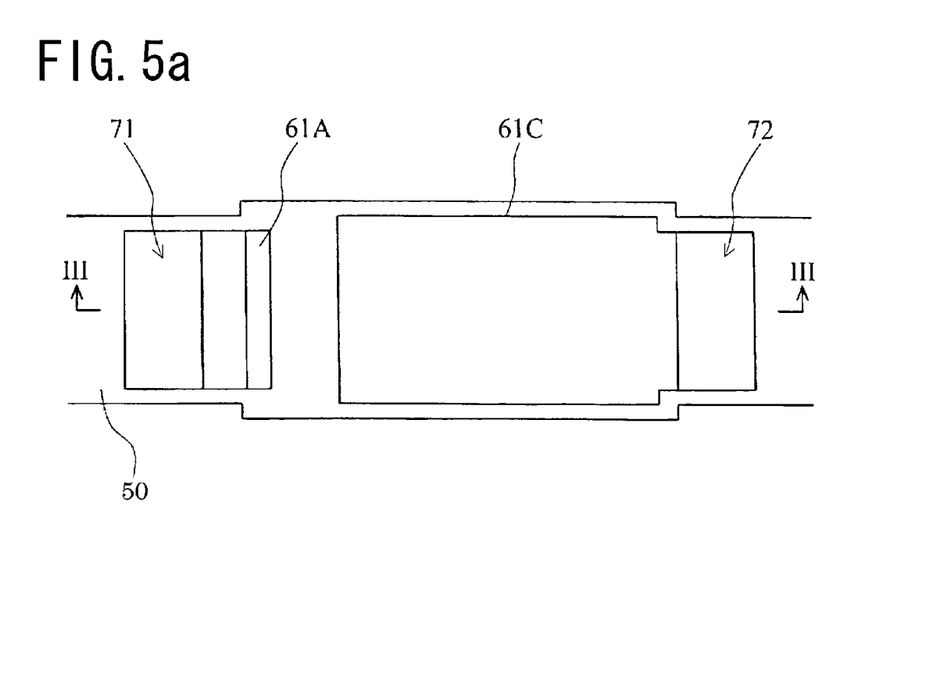
FIGS. 5a and 5b are views for explaining one step of the electrode forming step of the first embodiment.
Figure 5B:
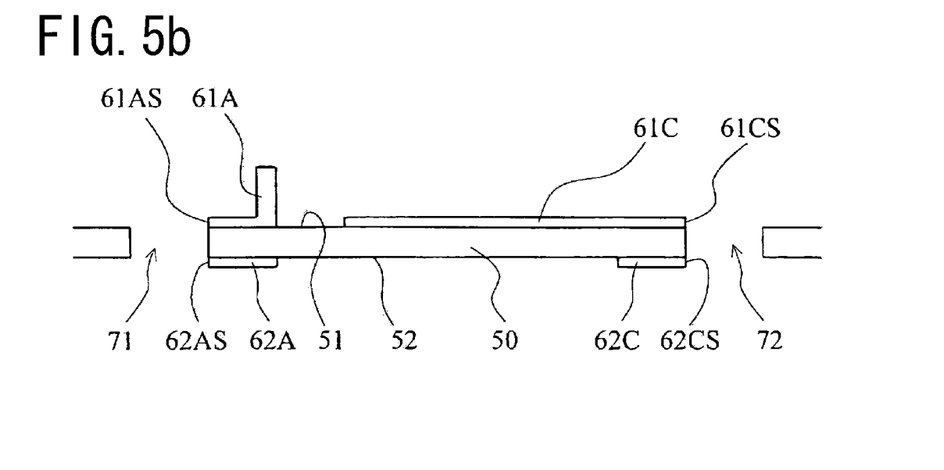

The third step is described with reference to FIGS. 5a and 5b. FIG. 5a is a top view, and FIG. 5b is an end view of a sectioned part cut along a line shown in FIG. 5a. By punching out an area of the insulating base 50 which is bounded by an A1 line shown in FIG. 4a, namely an area located in the opposite side of the first anode parent material part 61A to the first cathode parent material part 61C, a through-hole 71 is formed as shown in FIG. 5a. At this time, end parts of the first and second anode parent material parts 61A, 62A are punched out together with the area of the insulating base 50. Therefore, as shown in FIG. 5b, side edge surfaces 61AS, 62AS of the first and second anode parent material parts 61A, 62A, are exposed to inside of the through-hole 71.

Further, by punching out an area of the insulating base 50 which is bounded by an A2 line shown in FIG. 4a, namely an area located in the opposite side of the first cathode parent material part 61C to the first anode parent material part 61A, a through-hole 72 is formed as shown in FIG. 5a. At this time, end parts of the first and second cathode parent material parts 61C, 62C are punched out together with the area of the insulating base 50. Therefore, as shown in FIG. 5b, side edge surfaces 61CS, 62CS of the first and second cathode parent material parts 61C, 62C are exposed to inside of the through-hole 72.

Figure 6A:
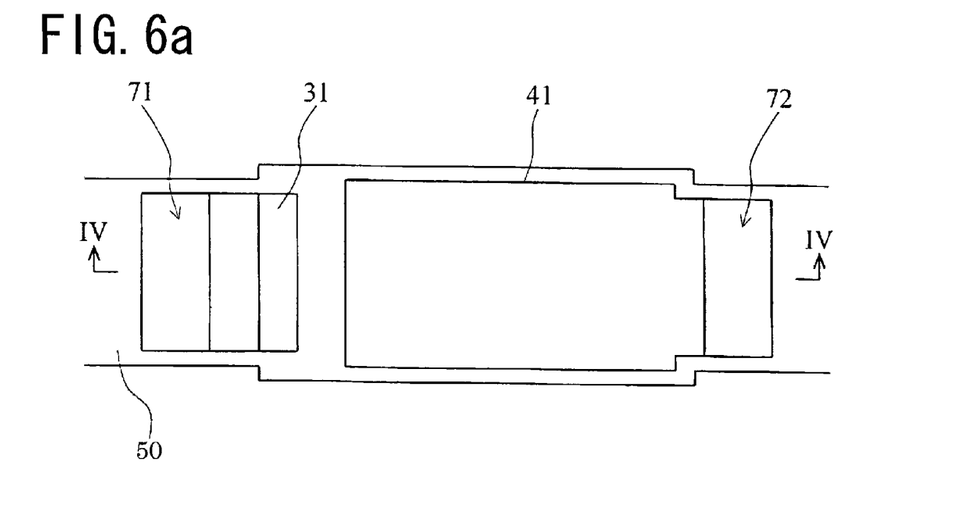
FIGS. 6a and 6b are views for explaining one step of the electrode forming step of the first embodiment.
Figure 6B:
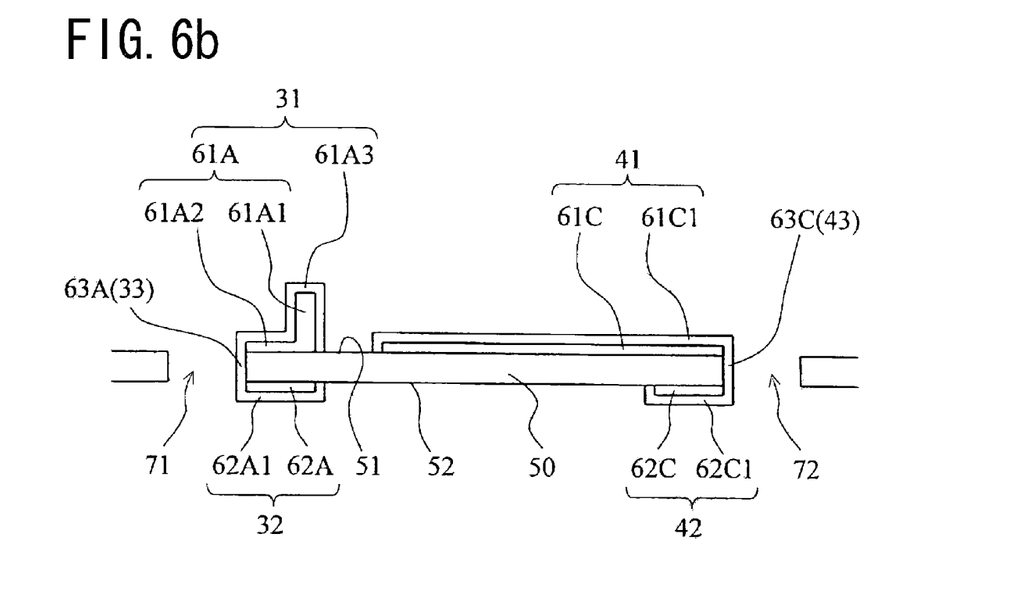

The fourth step is described with reference to FIGS. 6a and 6b. FIG. 6a is a top view, and FIG. 6b is an end view of a sectioned part cut along a line IV-IV shown in FIG. 6a. By performing electrolytic or nonelectrolytic plating, an anode conduction plating part 63A is formed on an inner surface of the insulating base 50 facing the through-hole 71 and the side edge surfaces 61AS, 62AS of the first and second anode parent material parts 61A, 62A. Also, a first anode plating part 61A3 is formed on an outer periphery of the first anode parent material part 61A except the side edge surface 61AS of the first anode parent material part 61A, while a second anode plating part 62A1 is formed on an outer periphery of the second anode parent material part 62A except the side edge surface 62AS of the second anode parent material part 62A.

The first anode parent material part 61A and the first anode plating part 61A3 form the first anode terminal portion 31 shown in FIG. 1, the second anode parent material part 62A and the second anode plating part 62A1 form the second anode terminal portion 32 shown in FIG. 1, and the anode conduction plating part 63A forms the anode conduction part 33 shown in FIG. 1. Thus, formed is the anode terminal 3 comprising the first anode terminal portion 31 and the second anode terminal portion 32 electrically connected to each other by the anode conduction part 33.

Similarly, a cathode conduction plating part 63C is formed on an inner surface of the insulating base 50 facing the through-hole 72 and the side edge surface 61CS, 62CS of the first and second cathode parent material parts 61C, 62C. Also, a first cathode plating part 61C1 is formed on an outer periphery of the first cathode parent material part 61C except the side edge surface 61CS of the first cathode parent material part 61C, while a second cathode plating part 62C1 is formed on an outer periphery of the second cathode parent material part 62C except the side edge surface 62CS of the second cathode parent material part 62C.

The first cathode parent material part 61C and the first cathode plating part 61C1 form the first cathode terminal portion 41 shown in FIG. 1, the second cathode parent material part 62C and the second cathode plating part 62C1 form the second cathode terminal portion 42 shown in FIG. 1, and the cathode conduction plating part 63C forms the cathode conduction part 43 shown in FIG. 1. Thus, formed is the cathode terminal 4 comprising the first cathode terminal portion 41 and the second cathode terminal portion 42 electrically connected to each other by the cathode conduction part 43.

As plating, a copper plating layer or a copper-tin plating layer can be formed alone, or the copper-tin plating layer can be formed on the copper plating layer which serves as a foundation plating layer.

Figure 7A:
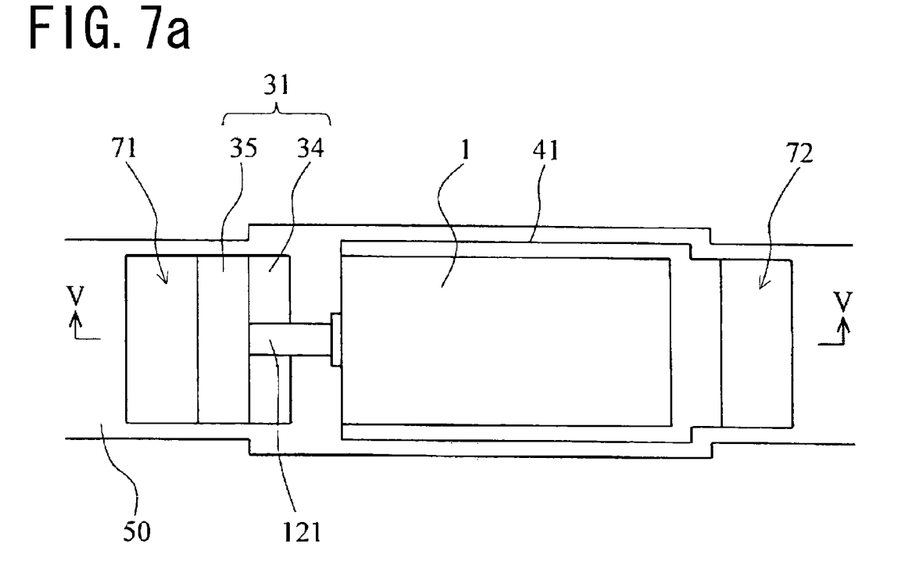
FIGS. 7a and 7b are views for explaining an element mounting step of the first embodiment.
Figure 7B:
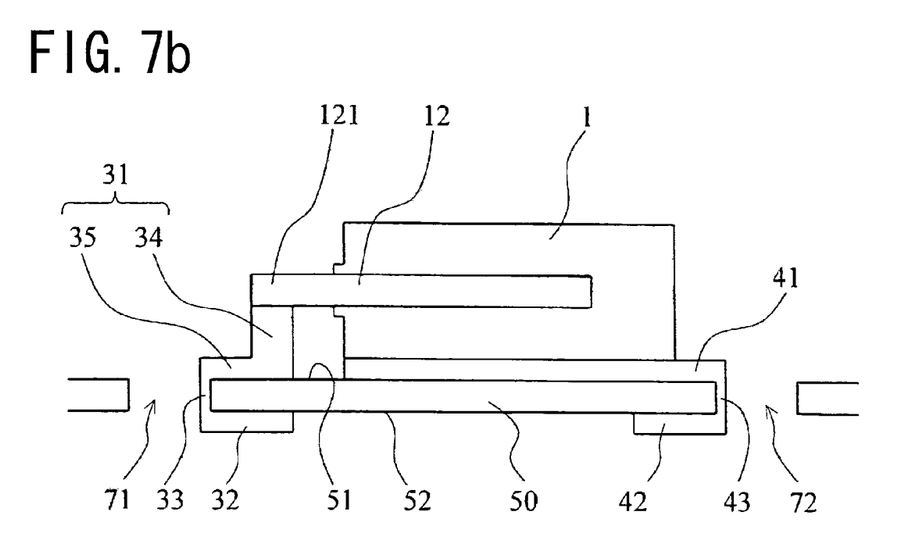

The element mounting step is described with reference to FIGS. 7a and 7b. FIG. 7a is a top view, and FIG. 7b is an end view of a sectioned part cut along a line V-V shown in FIG. 7a. The capacitor element 1 is mounted on the upper surface 51 of the insulating base 50, the anode lead-out part 121 of the capacitor element 1 is electrically connected to the end part of the connection part 34 of the first anode terminal portion 31 by resistance welding, laser welding, or the like, and the cathode layer 15 of the capacitor element 1, namely the cathode section 1C, is electrically connected to the first cathode terminal portion 41 by the electrically-conductive adhesive.

Figure 8A:
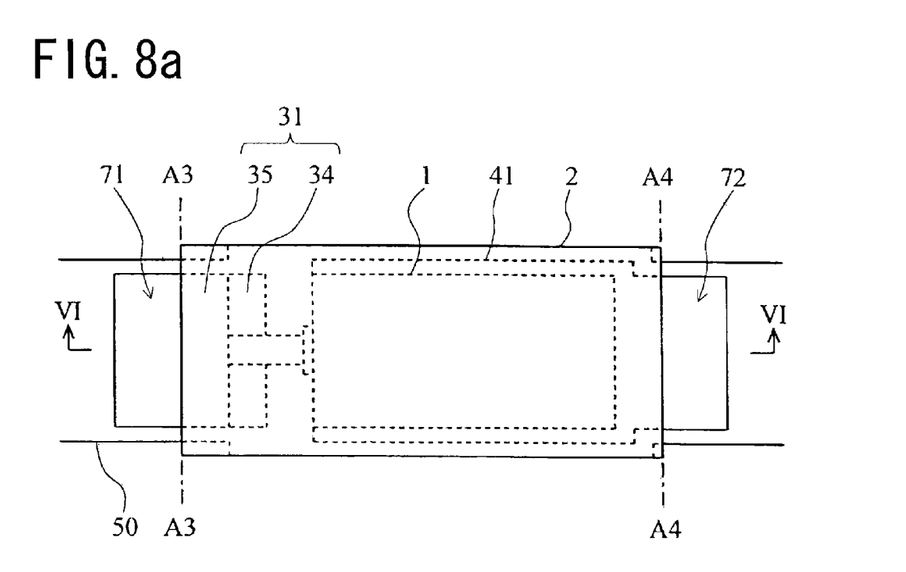
FIGS. 8a and 8b are views for explaining a resin coating step of the first embodiment.
Figure 8B:
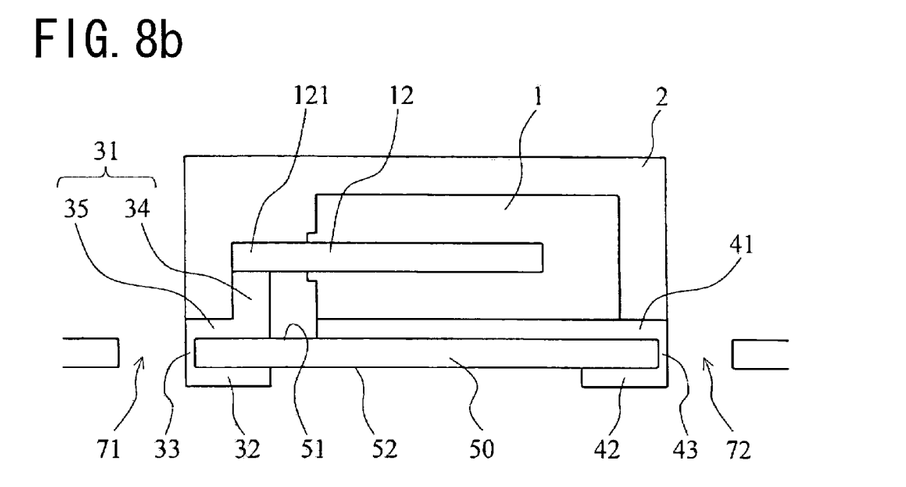

The resin coating step is described with reference to FIGS. 8a and 8b. FIG. 8a is a top view, and FIG. 8b is an end view of a sectioned part cut along a line VI-VI shown in FIG. 8a. An enclosure resin liquid is applied to the upper surface of the insulating base 50 at a position between the through-hole 71 and the through-hole 72, and is hardened to coat the capacitor element 1 with an enclosure resin 2. At this time, the lower surface 52 of the insulating base 50 is not coated with the enclosure resin 2 and is maintained in an exposed state. Therefore, the second anode terminal portion 32 and the second cathode terminal portion 42 formed on the lower surface 52 of the insulating base 50 are arranged so as to be exposed from the enclosure resin 2, and the second anode terminal portion 32 and the second cathode terminal portion 42 form the lower surface electrodes.

In the cutting step, the insulating base 50 is cut along an A3-A3 line and an A4-A4 line shown in FIG. 8a. Thus, the solid electrolytic capacitor shown in FIG. 1 is completed.

In the solid electrolytic capacitor according to the first embodiment, a path length between the anode section of the capacitor element and the second anode terminal portion, and a path length between the cathode section of the capacitor element and the second cathode terminal portion are shorter than those in the conventional solid electrolytic capacitor shown in FIG. 12. Therefore, it is possible to reduce the ESR by approximately 17%, and the ESL by approximately 25%.

Also, in the solid electrolytic capacitor according to the first embodiment, since the connection part 34 and the basal part 35 are formed integrally, it is not necessary to execute the complicated step required in the manufacturing process of the conventional solid electrolytic capacitor shown in FIG. 13 in which the connection part 34 and the basal part 35 are formed as different members from each other, namely the complicated step of installing the pad member 98 on the first anode terminal portion 931a before mounting the capacitor element 91 on the wiring member 95. Also, a connecting state between the connection part 34 and the basal part 35 is good, thereby reducing the ESR or the ESL of the solid electrolytic capacitor.

Further, in the solid electrolytic capacitor according to the first embodiment, since a thickness of the first anode plating part 61A3 is generally the same as that of the first cathode plating part 61C1, it is possible to form the first anode plating part 61A3 and the first cathode plating part 61C1 simultaneously. Therefore, the thickness can be controlled easily and the yield ratio is high compared to the conventional solid electrolytic capacitor shown in FIG. 14. Also, since around several to several tens of μm is enough for the thickness, only a short time for plating and a few man-hours are needed, resulting in no increase in cost.

Since the through-holes 71, 72 are opened and the anode and cathode conduction parts 33, 43 are formed by plating inner walls of the holes, even after the cutting along the line A3 and the line A4, a plating surface still exists on the side surface of the solid electrolytic capacitor. Accordingly, even when the solid electrolytic capacitor according to the first embodiment is mounted, for example, on a mother board of a computer by solder, a solder fillet is formed between the anode conduction part 33 and a land of the mother board, and between the cathode conduction part 43 and a land of the mother board. Therefore, obtained is an advantageous effect of enhancing solder bonding strength compared to the conventional solid electrolytic capacitor shown in FIG. 13 as well as enabling inspection of the solder bonding by visual inspection or the pattern recognition to be executed surely.

[Second Embodiment]

Figure 9:
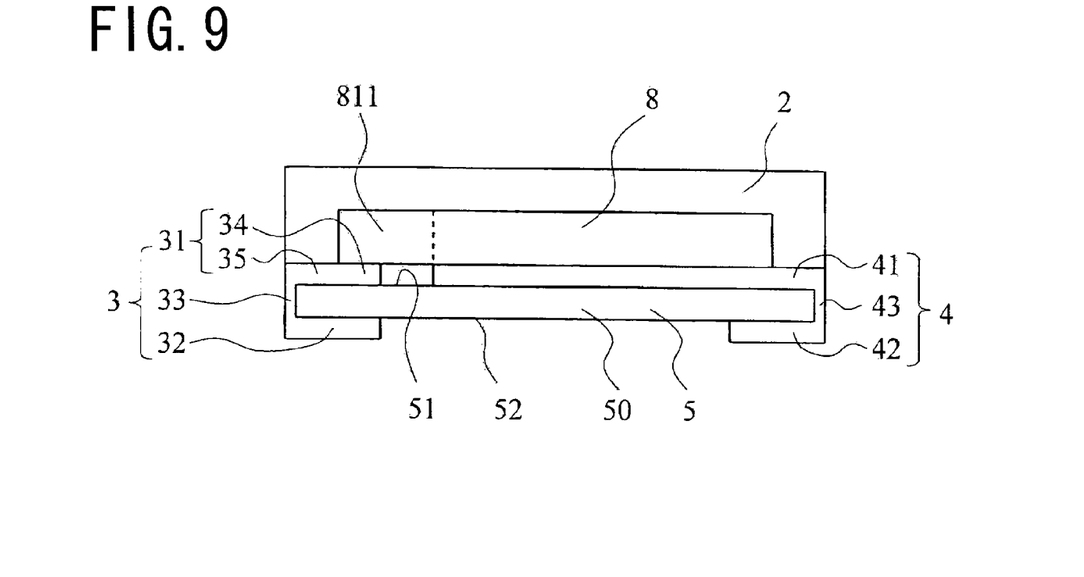
FIG. 9 is a cross-sectional view of a solid electrolytic capacitor according to a second embodiment of the present invention.

FIG. 9 is a cross-sectional view of the solid electrolytic capacitor according to the second embodiment of the present invention. As shown in FIG. 9, on the wiring member 5, a capacitor element 8 comprising a foil-like anode body 81 is mounted instead of the solid electrolytic capacitor according to the first embodiment.

Figure 10:
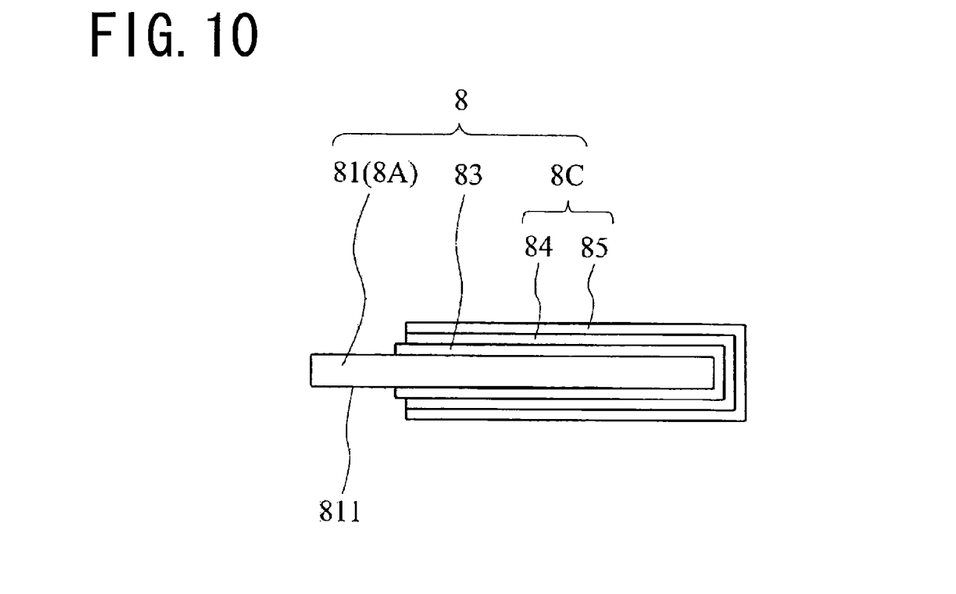
FIG. 10 is a cross-sectional view of a capacitor element according to the second embodiment of the present invention.

Specifically, as shown in FIG. 10 (a cross-sectional view), the capacitor element 8 comprises the anode body 81, a dielectric film 83 formed on a part of an outer peripheral surface of the anode body 81, a solid electrolyte layer 84 formed on the dielectric film 83, and a cathode layer 85 formed on the solid electrolyte layer 84.

For the anode body 81, used is a foil-like body of the valve-metal (tantalum, niobium, titanium, aluminum or the like) a surface of which is etched to be roughened. And the anode body 81 forms an anode section 8A.

The dielectric film 83 is formed by an oxide film formed on the part of the outer peripheral surface of the anode body 81, and the oxide film is formed by immersing a part of the anode body 81 in an electrolytic solution such as phosphate aqueous solution, adipic acid aqueous solution, or the like to oxidize the part of the outer peripheral surface of the anode body 81 electrochemically (anodic oxidation).

The solid electrolyte layer 84 is formed of an electrically-conductive inorganic material such as manganese dioxide or the like, or an electrically-conductive organic material such as TCNQ (Tetracyano-quinodimethane) complex salt, electrically-conductive polymer or the like, and formed on the dielectric film 83.

The cathode layer 85 is formed by a carbon layer formed on the solid electrolyte layer 84 and a silver paste layer formed on the carbon layer, and the solid electrolyte layer 84 and the cathode layer 85 are electrically connected to each other. The solid electrolyte layer 84 and the cathode layer 85 form a cathode section 8C.

The capacitor element 8 according to the second embodiment includes an anode body exposed part 811 which is a part of the outer peripheral surface of the anode body 81 and is not coated by the dielectric film 83 and exposed.

As shown in FIG. 9, a surface of the connection part 34 of the first anode terminal portion 31 located on the capacitor element 8 side is formed so as to be substantially flush with a surface of the basal part 35 of the first anode terminal portion 31 located on the capacitor element 8 side. And, the connection part 34 and the anode body exposed part 811 are electrically connected to each other by resistance welding, laser welding or the like.

The cathode layer 85 of the capacitor element 8, namely the cathode section 8C, is electrically connected to the first cathode terminal portion 41 by the electrically-conductive adhesive in a similar manner to the solid electrolytic capacitor according to the first embodiment shown in FIG. 1.

Also in the solid electrolytic capacitor according to the second embodiment, obtained is an advantageous effect in comparison with the conventional solid electrolytic capacitors in a similar manner to the solid electrolytic capacitor according to the first embodiment.

[Third Embodiment]

The third embodiment is different from the first embodiment only in a shape of the first anode plating part 61A3. Therefore, only matters different from the first embodiment are described here and the description on the other matters is omitted.

Figure 11:
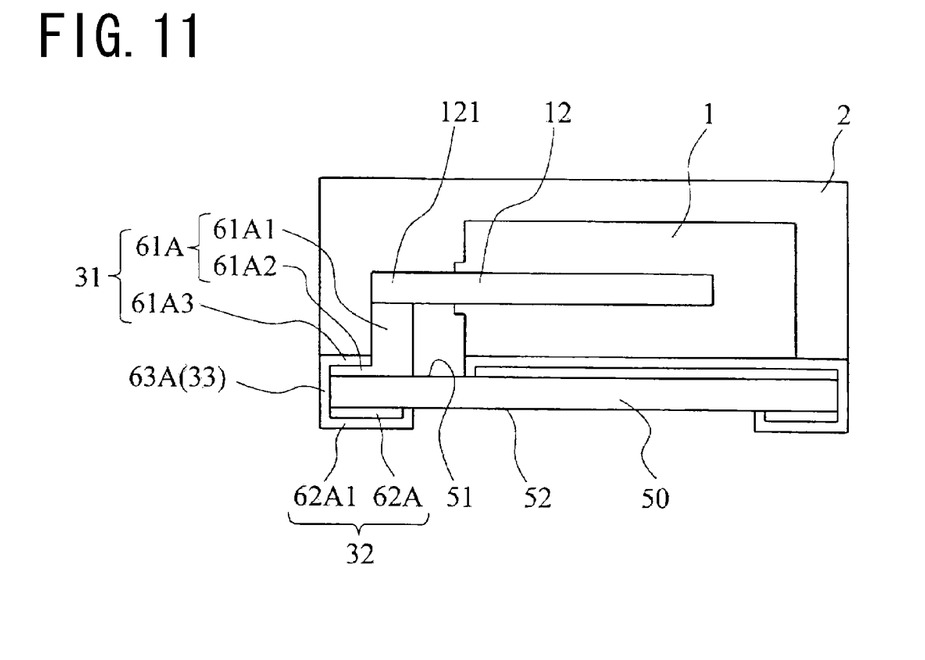
FIG. 11 is a cross-sectional view of a solid electrolytic capacitor according to a third embodiment of the present invention.

FIG. 11 shows a cross-sectional view of the solid electrolytic capacitor according to the third embodiment. In the first embodiment, the first anode plating part 61A3 is formed on the outer peripheries of the parent material connection part 61A1 and the parent material basal part 61A2. However, in the third embodiment, the first anode plating part 61A3 is not formed on the outer periphery of the parent material connection part 61A1, and is formed only on the outer periphery of the parent material basal part 61A2. Therefore, the parent material connection part 61A1 is electrically connected to the anode lead-out part 121 by resistance welding, laser welding, or the like.

Therefore, the third embodiment has an effect of not affecting the resistance welding or the laser welding even if a formation state of the first anode plating part 61A3 is not a desired state, which the first embodiment does not have.

The present invention is not limited to the foregoing embodiment in construction but can be modified variously within the technical range set forth in the appended claims. In the embodiments described above, copper and tin are used as main materials of the anode terminal 3 and the cathode terminal 4, but the present invention is not limited to this, and various kinds of electrical conducting materials can be used as said materials. Also, the position and shape of the connection part 34 is not limited to those described in the embodiments, but various positions and shapes of the connection part 34 may be employed.

What is claimed is:

1. A solid electrolytic capacitor comprising:
   a capacitor element including an anode section, a dielectric film, and a cathode section;
   a wiring member on which the capacitor element is mounted; and
   an enclosure resin coating the capacitor element,
   wherein the wiring member comprises:
   an insulating base;
   a first anode terminal portion provided on a first surface of the insulating base on which the capacitor element is mounted, and electrically connected to the anode section of the capacitor element;
   a second anode terminal portion provided on a second surface of the insulating base opposed to the first surface; and
   an anode conduction part provided on a side surface of the insulating base, and electrically connecting the first and second anode terminal portions to each other,
   wherein the first anode terminal portion includes a basal part and a connection part, the basal part includes a first parent material part and a first plating part that is formed by plating a surface of the first parent material part, and the connection part includes a second parent material part that is integrally formed with the first parent material part, the second parent material part projecting from the first parent material part,
   wherein the anode section of the capacitor element is electrically connected to the connection part.

2. The solid electrolytic capacitor according to claim 1, wherein part of a surface of the second parent material part is exposed from the first plating part, and the anode section of the capacitor element is electrically connected to the part of the surface of the second parent material part.

3. The solid electrolytic capacitor according to claim 1, wherein the connection part further includes a second plating part that is formed by plating a surface of the second parent material part, and the anode section of the capacitor element is electrically connected to the second plating part.

4. The solid electrolytic capacitor according to claim 1, wherein the anode conduction part is exposed from the enclosure resin.

* * * * *